United States Patent [19]
Kurkjian, Jr.

[11] 3,934,850
[45] Jan. 27, 1976

[54] ADJUSTABLE VALVE SEAT
[75] Inventor: Gregory A. Kurkjian, Jr., Wheaton, Ill.
[73] Assignee: Henry Pratt Company, Aurora, Ill.
[22] Filed: Aug. 8, 1974
[21] Appl. No.: 495,644

[52] U.S. Cl. ............... 251/171; 251/192; 251/307; 251/362
[51] Int. Cl.² .......................................... F16K 25/00
[58] Field of Search ........... 251/170, 171, 362, 192, 251/305–307; 277/108, 190, 101; 403/43

[56] References Cited
UNITED STATES PATENTS
| | | | |
|---|---|---|---|
| 1,364,599 | 1/1921 | Wilder | 403/43 |
| 3,144,040 | 8/1964 | White | 137/315 |

FOREIGN PATENTS OR APPLICATIONS
| | | | |
|---|---|---|---|
| 802,330 | 2/1951 | Germany | 251/307 |

Primary Examiner—William R. Cline
Assistant Examiner—H. J. Spiegel
Attorney, Agent, or Firm—Wegner, Stellman, McCord, Wiles & Wood

[57] ABSTRACT

A valve, such as a butterfly valve, having an adjustable valve seat. The valve includes a valve body having an interior passage and a valve member journalled in the body for movement between positions opening and closing the passage. The body further includes an inwardly opening groove for receiving a valve seat formed of a flexible material. Also received within the groove is an arcuate structure, the circumference of which can be selectively adjusted. As the circumference is increased, the arcuate structure bears against the valve seat to compress the same and distort a portion thereof into the passage to provide good sealing contact with the valve member.

5 Claims, 5 Drawing Figures

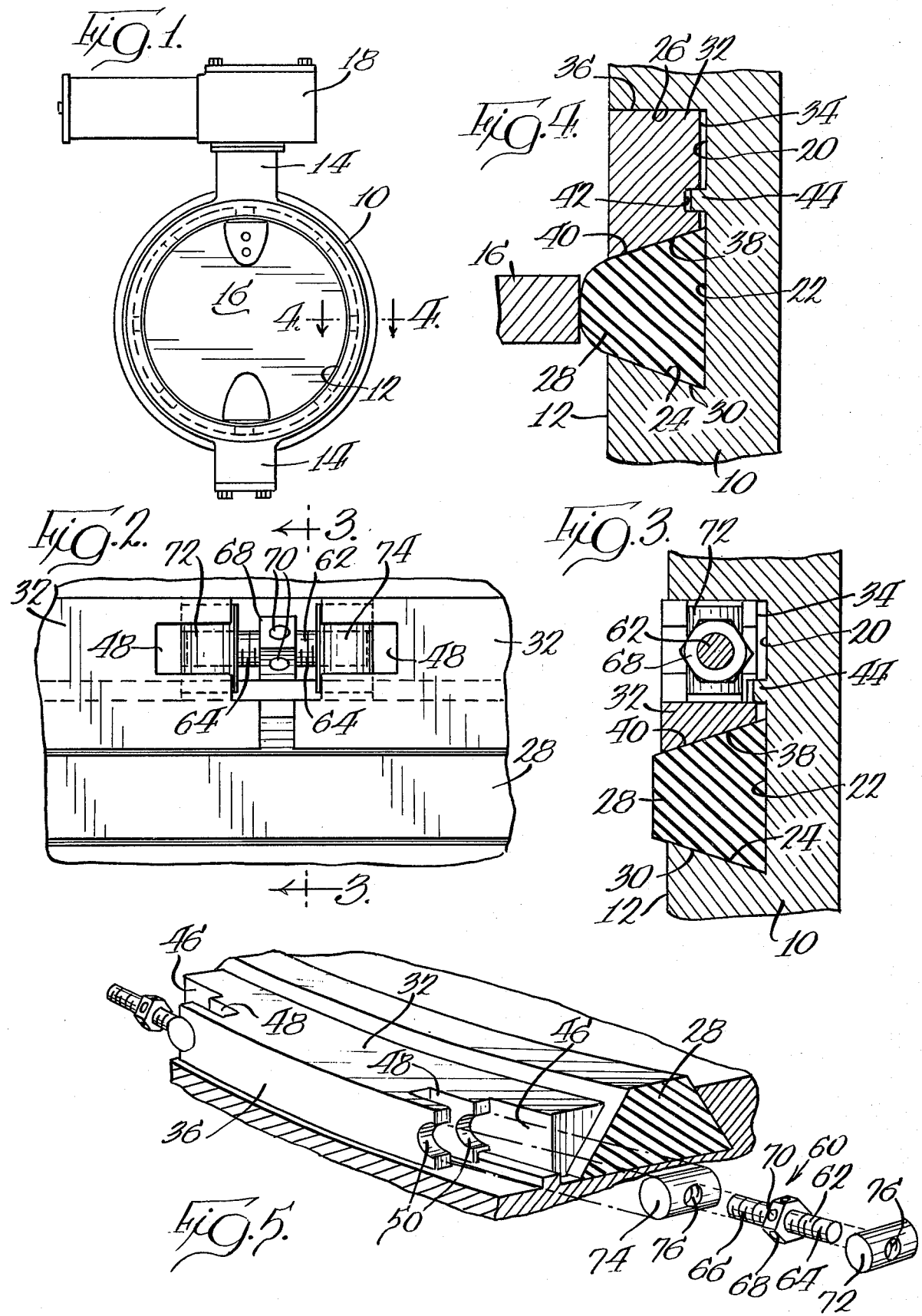

ADJUSTABLE VALVE SEAT

BACKGROUND OF THE INVENTION

This invention relates to valves, and more particularly, to valves having adjustable valve seats. Relevant prior art includes the following U.S. Pat. Nos: White 3,144,040; Killian 3,197,174; Fawkes 3,393,697; and Kurkjian 3,412,975.

In large valves, such as butterfly valves which frequently have fluid flow passages of diameters of two feet and greater, considerable difficulty has been encountered in obtaining uniform sealing contact between a valve member and a valve seat when the former is in a closed position. The valve seats typically employed are of resilient, flexible material that is much softer than the material of which the valve member is formed, and are designed to deform slightly when the valve member is moved to a closed position to provide the requisite sealing contact. If the sealing surface of the valve seat is not properly located with respect to the valve, the valve will either leak or accelerated wear of the valve seat will occur. For example, when the valve seat is improperly located so that something less than the desired deformation occurs when the valve member is moved to the closed position, the possibility of leakage exists. On the other hand, when the valve seat is too close to the valve member and must be deformed more than the optimal amount, the difference in material hardness can cause the accelerated wear of the valve seat with the result that valve failure is more prone to occur.

There have been a variety of proposals over the years for adjustable valve seats, and the four above-identified United States patents indicate various ones of such proposals. Such structures have proved to be quite successful in accomplishing their intended purpose. However, the same generally require some means of attachment to a valve body requiring machining operations for receipt of threaded fasteners or the like. Thus, the valves made according to such patents tend to be somewhat more expensive than would be desirable due to the need for such machining operations.

SUMMARY OF THE INVENTION

It is a principal object of the invention to provide a new and improved valve having an adjustable valve seat. More specifically, it is an object of the invention to provide such a valve wherein the valve seat can be easily and simply adjusted and wherein the adjusting structure is economical to fabricate.

The exemplary embodiment of the invention achieves the foregoing object in a structure including a valve body having an interior passage through which fluid may flow. A valve member, such as a butterfly disc, is journalled in the body for movement between positions opening and closing the passage. The body includes a peripheral, inwardly opening groove directed toward the passage which groove has opposed side walls and which is aligned with the valve member when the same is in a position closing the passage.

A valve seat of flexible material is disposed within the groove and one of the sides thereof is in abutment with one of the side walls of the groove. An arcuate structure is also disposed in the groove and means are provided for selectively effectively increasing the arc length of the arcuate structure to cause the same to expand radially outwardly into the groove. Cooperating surfaces on the arcuate structure and the valve seat cause the latter to be compressed and deformed into the passage. By selectively increasing the circumference of the arcuate structure, the degree of compression, and thus distortion, can be set at an optimum to obtain good sealing contact without causing accelerated wear at varying locations on the valve seat.

According to the exemplary embodiment of the invention, the arcuate structure is comprised of a plurality of arcuate segments and the means by which the arcuate length may be effectively increased includes a series of turnbuckles, the turnbuckles being located between adjacent ends of adjacent ones of the segments.

In a highly preferred embodiment, the groove in the valve body is narrower at the top than at the bottom and the valve seat is trapezoidal in cross section. The valve seat engaging surface of each arcuate member is complementary to the sloping surface of the valve seat.

The turnbuckles include a screw shaft having right-handed and left-handed threads thereon which receive respective nuts. The nuts in turn pivotally embrace respective ends of the segments forming the arcuate structure. An adjusting means is provided on the screw shaft between the right and left-hand threads.

In a highly preferred embodiment of the invention, the groove in the valve body is provided with an annular radially inwardly directed flange which is adapted to be disposed in a radially outwardly facing groove in each of the segments to act as a guide means for the segments when the turnbuckles are operated to increase the circumference of the arcuate structure.

Other objects and advantages will become apparent from the following specification taken in conjunction with the accompanying drawings.

DESCRIPTION OF THE DRAWINGS

FIG. 1 is a side elevation of a valve, particularly a butterfly valve, embodying the invention;

FIG. 2 is an enlarged, fragmentary view of a portion of the valve seat and the valve seat adjusting means of the invention;

FIG. 3 is a sectional view taken approximately along the line 3—3 of FIG. 2;

FIG. 4 is a sectional view taken approximately along the line 4—4 of FIG. 1; and FIG. 5 is a fragmentary perspective view of a valve seat and valve seat adjusting means made according to the invention.

DESCRIPTION OF THE PREFERRED EMBODIMENT

An exemplary embodiment of a valve made in accordance with the invention is seen in the drawings and with reference specifically to FIG. 1 is seen to include a valve body 10 having an interior passage 12 through which fluid may pass. Typically, passage 12 will be cylindrical, although in some instances, other shapes may be employed. Trunnions 14 on the valve body 10 journal the valve member 16, illustrated as a disc of a butterfly valve, for rotation between positions opening and closing the passage 12. Typically, a valve operator 18 will be employed for rotating the valve member 16.

As best seen in FIGS. 3-5, inclusive, the valve body 10 is provided with annular, inwardly opening groove 20 having a bottom 22 and opposed side walls 24 and 26. Received within the groove 20 is a ring-like valve seat 28 formed of any suitable resilient, flexible material. Various materials are well known in the art and form no part of the instant invention.

As seen in FIG. 3, the valve seat 28 is trapezoidal in cross section and has one side 30 thereof figured to conform with the side wall 24 of the groove 20 which is formed so that it is narrower at its point of emergence into the passage 12 than at its bottom 22. This formation serves to ensure that the valve seat 28 is tightly held in place within the groove 20.

Also received within the groove 20 is the arcuate structure mentioned previously which is defined by a plurality of arcuate segments 32.

The radial outer surface 34 of each of the segments 32 has a curvature approximately equal to that of the bottom 22 of the groove 20. Each segment 32 also includes a side surface 36 which is arranged to be disposed generally transversely to the axis of the passage 12 and to be flush with side wall 26 of the groove 20.

The side 38 of each segment 32 opposite the side 36 is diagonal so as to slope away from the side wall 24 of the groove 20 as one progresses radially outwardly from the center of the valve. A side 40 of the valve seat 28 has a slope complementary to the slope of the sides 38 of the segments 32.

The underside 34 of each segment 32 includes an outwardly opening groove 42 which is adapted to receive an annular, radially inwardly extending flange 44 within the groove 20. The groove 42 and flange 44 serve as a guide means to guide the segments 32 for movement radially of the passage 12 and preclude axial movement of the segments 32.

At opposite ends of each of the segments 32, a notch 46 is provided in the side 36. One wall of each notch is provided with a slot 48 which is flanked by semicircular recesses 50.

As generally alluded to previously, a plurality of segments 32 are employed to define an arcuate structure extending peripherally around the valve member 16 and located within the groove 20. Frequently, at least three such segments will be employed and not infrequently will at least eight such segments be employed. It will also be appreciated from the foregoing description of structure that, if the segments 32 are moved radially outwardly within the groove 20, they will cause compression of the valve seat 28 with the result that the same will deform into the passage 12 so as to sealingly engage the valve member 16 about its periphery. For example, with reference to FIG. 3, the valve seat 28 is seen when substantially no compressive forces are exerted upon it by the contact of the sides 38 of the arcuate segments 32 with the side 40 of the valve seat. On the other hand, FIG. 4 illustrates the distortion of the valve seat 28 into the passage 12 when the segments 32 have been moved radially outwardly to effectively increase the circumference of the arcuate structure that they define.

A means for effectively increasing the circumference or arc length of the arcuate structure will now be described. With reference to FIG. 5, a turnbuckle, generally designated 60, is provided. Specifically, for each of the segments 32 employed, a turnbuckle 60 is employed to interconnect adjacent ends of adjacent segments. Each turnbuckle 60 includes the screw shaft 62 having a right-hand thread 64 and a left-hand thread 66. Intermediate the right and left-hand threads 64 and 66 is a structure 68 enabling rotation of the screw shaft 62. As illustrated in FIG. 5, the same is a hex nut firmly affixed to the screw shaft 62. If desired, the faces of the hex nut may be provided with openings 70 for receipt of a prong-like tool to assist in rotation.

Each turnbuckle 60 further includes a pair of nuts 72 and 74. Each of the nuts 72 and 74 has a cylindrical shape with a threaded bore 76 extending through the cylindrical wall thereof. In the case of the nut 72, the threaded bore 76 will have a right-hand thread, while in the case of the nut 74, the cylindrical bore 76 will have a left-hand thread.

The nuts 72 and 74 are adapted to be pivotally received in the semicircular recesses 50 at adjacent ends of adjacent ones of the segments 32.

Thus, by rotation of the screw shaft 62, the nuts 72 and 74 on each screw shaft 62 may be simultaneously advanced or retracted. When they are retracted, the effective circumference of the arcuate structure defined by the segments 32 is decreased, while, when advanced, the circumference is increased to drive the segments 32 radially outwardly and more deeply into the groove 20 in the body 10. As mentioned previously, as each segment advances more deeply into the groove, it will exert a compressive force on that portion of the valve seat 28 against which it bears. Consequently, any desired degree of distortion to provide optimum sealing contact can be obtained through appropriate adjustment of the various turnbuckles 60.

From the foregoing, it will be appreciated that a valve with a valve seat adjusting means made according to the invention possesses significant advantages over those heretofore known in terms of eliminating the need for special machining operations in the valve body for receipt of threaded fasteners by which compression of a valve seat is effected. Moreover, the use of the turnbuckles 60 allows rapid adjustment of the structure to achieve optimum sealing contact.

I claim:

1. A valve having an adjustable valve seat comprising:
   a valve body having an interior passage through which fluid may flow;
   a valve member journalled in said body for movement between positions opening and closing said passage;
   a peripheral, inwardly opening groove having opposed side walls in said body fronting on said passage and aligned with said valve member when said valve member is in a position closing said passage;
   a valve seat of flexible material and having opposed sides disposed within said groove and adapted to sealingly contact said valve member about its entire periphery when it is in a position closing said passage, one side of said valve seat abutting one of said groove side walls;
   at least one arcuate member within said groove about the periphery thereof and having a surface engaging the other side of said valve seat, said surface and said other side wall being configured such that when said member is progressively moved more deeply into said groove, said valve seat will be compressed and deformed into said passage; and
   means for selectively effectively increasing the arc length of said arcuate member to selectively cause said compression and deformation, said increasing means comprising a turnbuckle;
   there being plural said arcuate members and a substantially equal number of said turnbuckles, said turnbuckles being disposed between adjacent ends of said members within said groove.

2. The valve of claim 1 wherein said turnbuckles pivotally engage respective adjacent ends of said members.

3. A valve having an adjustable valve seat comprising:
- a valve body having an interior passage through which fluid may flow;
- a valve member journalled in said body for movement between positions opening and closing said passage;
- a peripheral, inwardly opening groove having opposed side walls in said body fronting on said passage and aligned with said valve member when said valve member is in a position closing said passage, one of said side walls being diagonally arranged such that the bottom of said groove is wider than the top thereof;
- a valve seat of flexible material and having opposed sides disposed within said groove and adapted to sealingly contact said valve member about its entire periphery when said valve member is in a position closing said passage, said valve seat being trapezoidal in cross section and having one side thereof abutting said one groove side wall;
- a plurality of arcuate segments within said groove and disposed about the periphery thereof, each having a diagonal surface engaging the other side of said valve seat and being movable radially outwardly within said groove; and
- a plurality of turnbuckles disposed between adjacent ends of adjacent segments and pivotally engaging the same, said turnbuckles being operable to increase the spacing between adjacent ends of adjacent ones of said segments to thereby effectively increase the periphery of the segments to cause the same to move radially inwardly into said groove to compress said valve seat to cause the same to deform into tight sealing engagement with said valve member when said valve member is in said closed position.

4. The valve seat of claim 3 wherein each said turnbuckle comprises a screw shaft having a right-handed thread and a left-handed thread and means disposed between said right-hand thread and said left-handed thread for rotating said screw shaft, each said turnbuckle further including a pair of nuts, one received on said right-handed thread and one received on said left-handed thread; and wherein each end of each of said segments includes a means for pivotally receiving a corresponding one of said turnbuckle nuts.

5. The valve of claim 3 wherein said groove includes a radially inwardly directed peripheral flange and each of said segments includes a radially outwardly facing groove for receiving said flange, said grooves and said flange serving as guide means for said segments during radial outward movement thereof within said groove in said valve body.

* * * * *